Feb. 9, 1960 W. D. ZETTLER 2,924,152
DRAWBOLT FOR MACHINE TOOLS
Filed Dec. 24, 1956 4 Sheets-Sheet 1
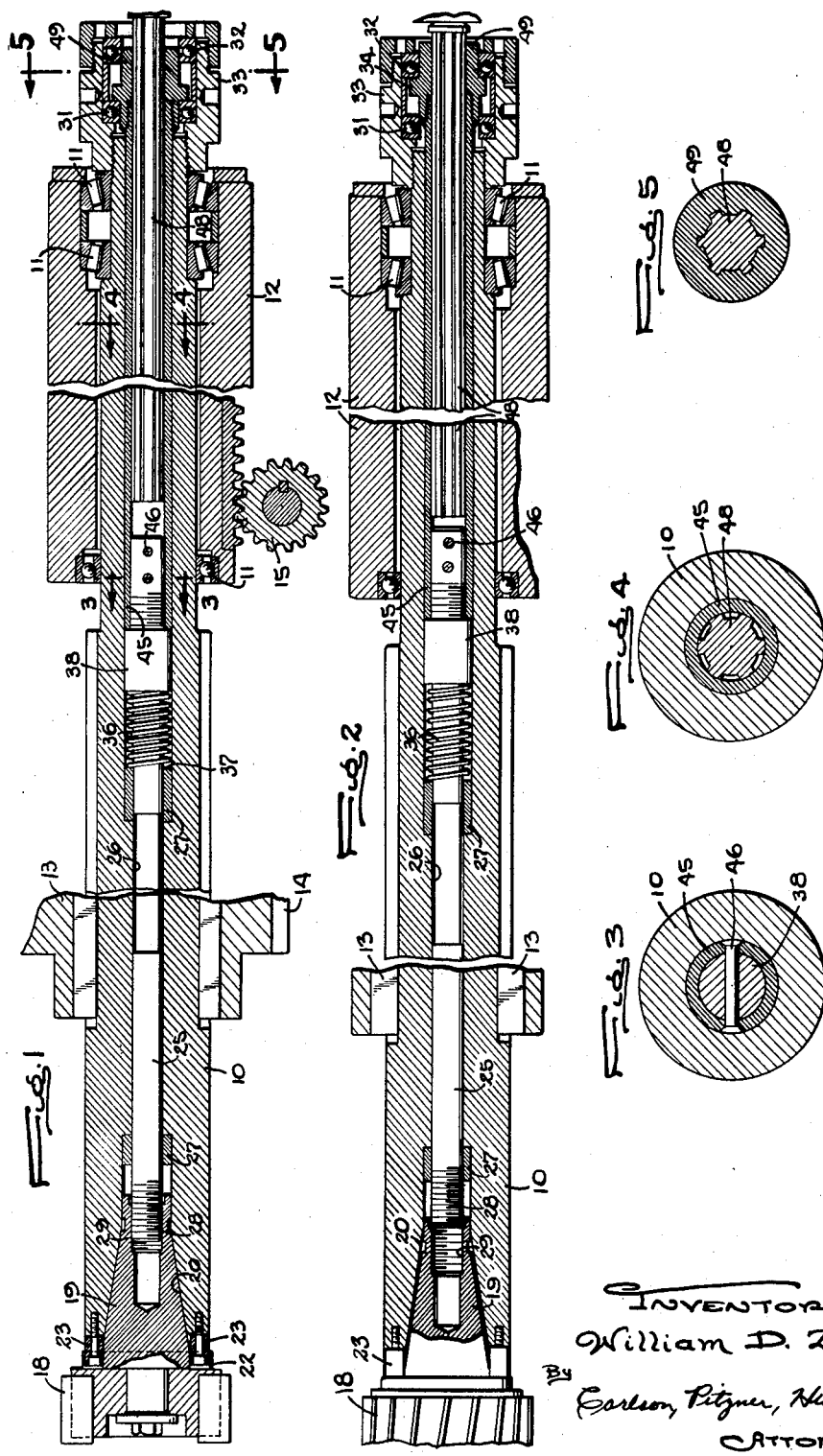

Feb. 9, 1960 — W. D. ZETTLER — 2,924,152
DRAWBOLT FOR MACHINE TOOLS
Filed Dec. 24, 1956 — 4 Sheets-Sheet 3

INVENTOR
WILLIAM D. ZETTLER
by: Carlson, Pitzner, Hubbard & Wolfe
ATTYS.

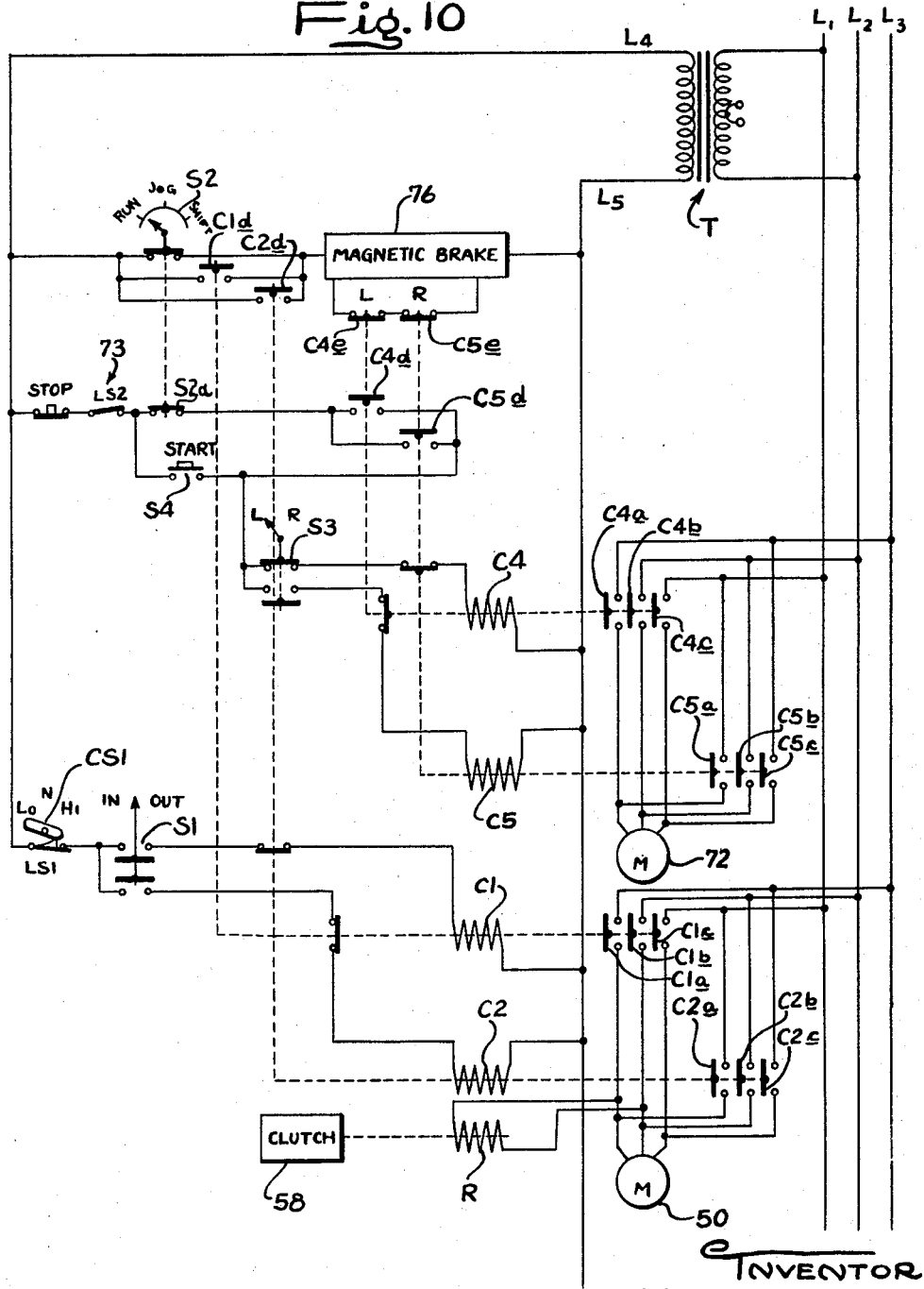

United States Patent Office 2,924,152
Patented Feb. 9, 1960

2,924,152

DRAWBOLT FOR MACHINE TOOLS

William D. Zettler, Fond du Lac, Wis., assignor to Giddings & Lewis Machine Tool Company, Fond du Lac, Wis., a corporation of Wisconsin Application December 24, 1956, Serial No. 630,381

6 Claims. (Cl. 90—11)

The present invention relates to a mechanism for locking a tool element or the like in a tool spindle, and finds particular but not exclusive use in horizontal boring, drilling and milling machines. More specifically, the present invention relates to a power drawbolt for selectively locking and releasing a tool in a machine tool spindle.

One object of the present invention is to provide an improved power drawbolt for securing a large, heavy cutting tool to a machine tool spindle or the like in a manner making the operation of mounting such a cutting tool safer and less hazardous to the machine tool operator.

Another object of the present invention is to provide a drawbolt of the foregoing type in which the clamping engagement with the cutting tool is improved for strengthening the tool mounting and for preventing the power drawbolt from rotating the cutting tool relative to the machine tool spindle.

A further object of the present invention is to provide an improved drawbolt of the foregoing type which is adapted both to hold a tool securely in a tool spindle and to release the tool positively from the spindle.

Still another object of the present invention is to provide an improved automatic power-operated drawbolt of the foregoing type which is constructed to dimensions standardized in the industry and which is susceptible of simple and safe operation.

Other objects and advantages will become apparent as the following description proceeds taken in connection with the accompanying drawings wherein:

Figure 1 is a longitudinal fragmentary section view of a machine tool spindle equipped with a drawbolt illustrative of the present invention and showing a cutting tool mounted in place.

Fig. 2 is a section view similar to Fig. 1 but showing the cutting tool being inserted in the spindle preparatory to engagement with the drawbolt.

Fig. 3 is a section view taken substantially in the plane of line 3—3 of Fig. 1 and showing the drawbolt and drawbolt drive sleeve construction in more detail.

Fig. 4 is a section view taken substantially in the plane of line 4—4 of Fig. 1 and showing the telescoping sleeve and shaft of the drawbolt.

Fig. 5 is a section view taken substantially in the plane of line 5—5 of Fig. 1 and showing the spline engagement between the drawbolt sleeve and shaft.

Fig. 10 is a schematic representation of an electrical control circuit useful for controlling the spindle and drawbolt illustrative of the present invention.

Figure 6:
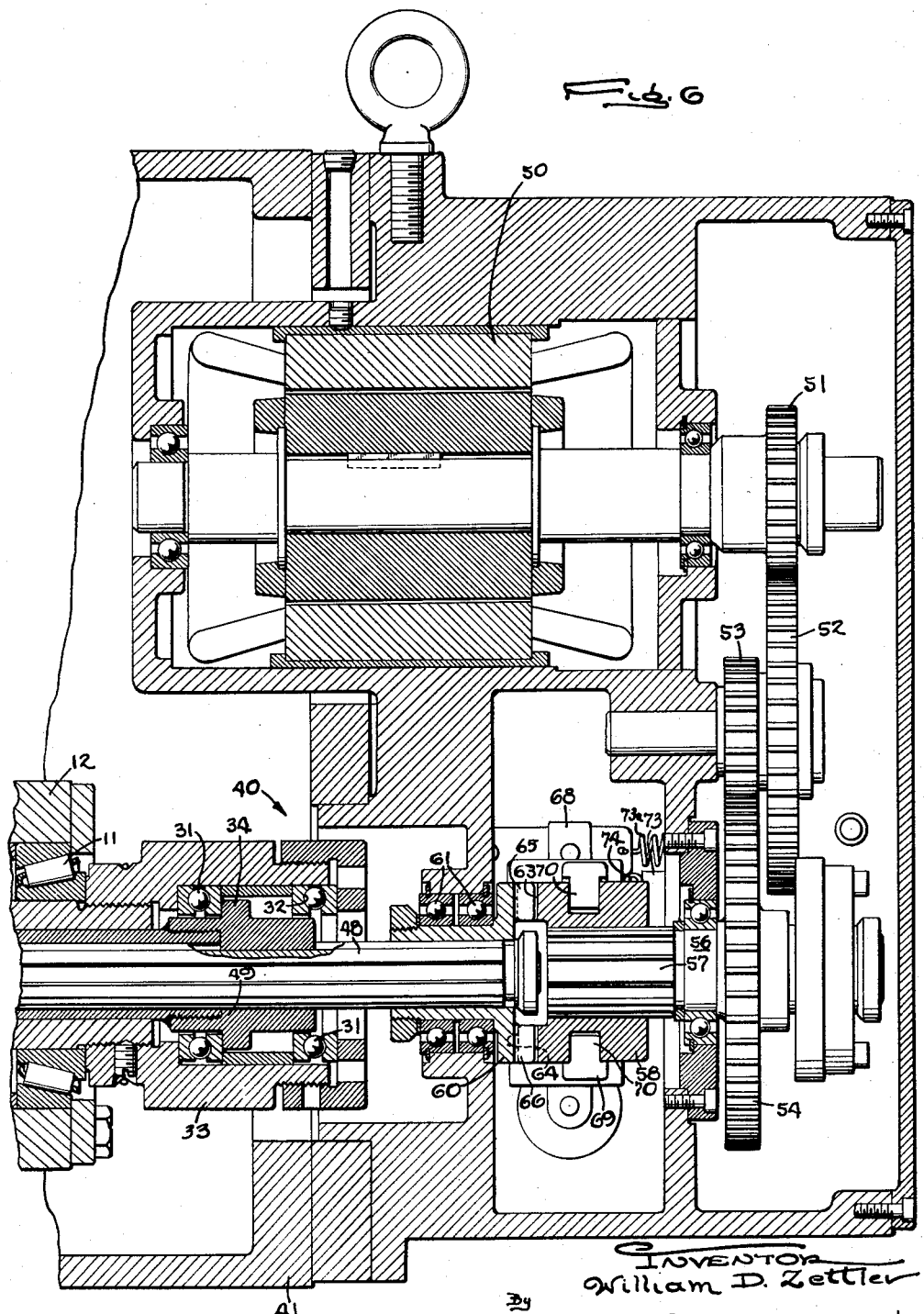
Fig. 6 is an elevation view, partly in section, showing the motor and transmission for driving the drawbolt.

While the invention is susceptible of various modifications and alternative constructions, a certain illustrative embodiment has been shown in the drawings and will be described below in detail. It should be understood, however, that there is no intention to limit the invention to the specific form disclosed herein, but, on the contrary, the intention is to cover all modifications, alternative constructions, equivalents and uses falling within the spirit and scope of the invention as expressed in the appended claims.

Referring more particularly to the drawings, there is shown a machine tool spindle 10 journaled by antifriction bearings 11 in a ram 12 and splined for relative axial movement to a rotary drive sleeve 13. To rotate the spindle, the sleeve is rotated by a drive gear 14 fixed thereto and operatively connected to a suitable drive means (not shown). The spindle is translated axially into and out of the machine tool by means of a rack and pinion drive 15 on the ram.

Mounted in the forward end of the spindle 10, shown at the left in Fig. 1, is a cutting tool 18 such as, for example, a face mill as shown in the drawings. The cutting tool 18 is rotated adjacent a workpiece (not shown) by rotation of the spindle 10 and is fed to or from the workpiece by axial movement of the spindle.

For the purpose of securing the cutting tool in the spindle, the cutting tool is formed with a tapered shank or arbor 19 insertable in a corresponding complementally tapered socket 20 in the end of the spindle. The tapered tool shank and spindle socket affords a wedging action for holding the tool securely within the spindle socket. To ensure further against rotation of the cutting tool with respect to the spindle when the cutting tool is mounted on the end thereof, the cutting tool head is formed with key slots 22 engageable with forwardly extending teeth or keys 23 on the end of the spindle adjacent the shank receiving socket.

Provision is made for holding the tool arbor within the spindle socket and for tightly clamping the tool to the spindle. This is accomplished by the improved power actuated drawbolt 25 illustrative of the present invention. The drawbolt extends through a bore 26 in the spindle in which it is mounted by bearings 27 for both rotation and translation. A suitable motor and transmission, to be described below, are provided to drive the drawbolt.

In order to engage the tapered tool shank or arbor 19, the end 28 of the drawbolt projecting into the spindle socket is threaded for engagement with a tapped hole 29 in the end of the shank 19. By rotating the drawbolt 25 relative to the spindle 10, the cutting tool 18 being held for rotation with the spindle by engagement of the keys 23 in the key slots 22, the drawbolt can be threadably engaged with the tool shank.

If the drawbolt is biased outwardly, as in the present machine tool practice, so that the operator must force the drawbolt inwardly by inserting the arbor against the drawbolt and compressing the biasing spring, the chances are good that the tool will not engage with the spindle keys before the power drawbolt motor is started. The tool will then rotate in the operator's hands and the possibility of injury are great. The danger is even more prominent when the tool arbor or shank is being released from the spindle. In this situation the drawbolt spring forces the tool outwardly to disengage the keys long before the threaded engagement with the arbor is released. Any imperfection or particle of dirt in the threads will then cause the arbor to stick on the drawbolt and the tool will rotate free of the spindle. Not only is this extremely dangerous but difficulties are often encountered in trying to release the tool arbor from the drawbolt.

In accordance with the present invention, the drawbolt is biased inwardly of the spindle and the axial movement of the drawbolt, both to its inner and outer positions, is limited. The purpose of the inward bias and the axial limitation on the movement of the drawbolt is to ensure that when the drawbolt is being operated to clamp a cutting tool to the spindle, the keys on the end of the spindle are at all times engaged with the key slots on the tool head. Through this desirable feature, the tool head is prevented from being rotated relative to the spindle by the drawbolt and causing serious injury to the operator who is mounting or dismounting the tool from the spindle.

The axial limits of movement of the drawbolt are determined by a pair of spaced thrust bearings 31, 32 mounted in a retaining nut 33 threadably engaged with the rear end of the spindle (shown at the right in Fig. 1). A thrust shoulder 34 on the end of the drawbolt is positioned intermediate the thrust bearings 31, 32 and serves as a stop or abutment, limiting the in and out movements of the drawbolt. The thrust bearings are so spaced that when the drawbolt 25 is in its rearmost or inward position in the spindle, only a small portion of its threaded end 28 extends into the spindle socket 20, this portion being just long enough for engaging the tool shank 19 when the tool shank is inserted in the spindle socket and the keys on the tool head are engaged with the keys on the spindle end (Fig. 2). Correspondingly, the forward position of the drawbolt or its outward extension from the spindle into the spindle socket, is limited by the forward thrust bearing 31. And again, the outward extension of the drawbolt is such that even when the threaded end 28 of the drawbolt 25 is engaged with the tapered shank 19 and the drawbolt is in its forwardmost position, the keys on the end of the spindle remain engaged with the key slots on the tool head. Thus, in all positions of the drawbolt the spindle and tool head are coupled to preclude any relative rotation between the tool head and the spindle. With the spindle and tool head remaining coupled at all times, there is no danger that the operator of the machine tool on which a power drawbolt of the above-described type is employed, will be injured by the accidental rotation of the cutting tool by the drawbolt should the threaded end of the drawbolt freeze or stick to the tool shank.

For the purpose of permitting the machine tool operator to direct his entire attention to the operation controls for actuating the drawbolt, provision is made for withdrawing the drawbolt from the tool shank receiving socket of the spindle, thereby permitting the inserted end of the tool shank to engage only a small portion of the end of the drawbolt and the keys 22, 23 to be substantially engaged before any threaded connection exists between the shank and the drawbolt. The tool being substantially in place before the drawbolt is contacted, it is only necessary for the operator to actuate a suitable control circuit to rotate the drawbolt for securing the tool in the spindle. When the drawbolt, threading itself into the tool shank, reaches its forwardmost position as determined by the engagement of the drawbolt thrust shoulder 34 with the forward thrust bearing 31, the tool shank 19 is pulled tightly into the spindle socket 20 to form a rigid connection between the tool and the spindle.

Further in accordance with the present invention, the drawbolt, when not engaged with a tool, is urged inwardly into the spindle. This is accomplished by means of a spring 36, for example, acting between a shoulder 37 formed by the drawbolt bearing 27 within the spindle and a collar 38 on the drawbolt 25. Expansion of the spring 36 thus urges the drawbolt inwardly while engagement of the drawbolt with the tool shank compresses the spring, as shown in Fig. 1. This action of the spring prevents engagement of the drawbolt with an inserted tool shank before the tool keys engage the spindle keys.

In the design of machine tools it is desirable that standardized dimensions be used wherever possible. The use of standard dimensions affords interchangeability of parts and eliminates the necessity of specially designed components. This practice is particularly desirable in the design of machine tools for the reason that one machine tool manufacturer might make a particular machine tool and another manufacturer might make a particular cutter or arbor for use on that machine tool.

The present invention contemplates this desirability of standardized dimensions. Accordingly, the novel drawbolt construction illustrative of the present invention is particularly well suited for use in machine tool spindles having standard nose dimensions for receiving tools and arbors also of standardized dimensions. Table 1 sets forth certain standard dimensions for milling machines in accordance with the specifications of the American Standards Association. The standard sizes are presented in the table, and are for a size 50 spindle nose and arbor which is a size commonly used on horizontal boring, drilling and milling machines of the type disclosed herein.

TABLE I

*American Standard*

SPINDLE NOSES AND ARBORS FOR MILLING MACHINES
ASA B5.18–1953
UDC 621.95

| | | |
|---|---|---|
| Size number | | 50 |
| Taper | in. per ft | 3.500 |
| Spindle clearance hole for drawbolt | in | 1 1/16 |
| Height of driving key | in | 1/2 |
| Full depth of arbor hole in spindle | in | 5 1/2 |
| Size of thread for drawbolt and arbor | | 1–8 |
| Length of perfect threads in arbor | in | 1 3/4 |
| Distance from rear of flange to end of arbor | in | 5 1/8 |
| Clearance of flange from gage diameter | in | 1/8 |
| Length of perfect threads on drawbolt | in | 1 3/8 |

In accordance with sound engineering practices, it is the custom to design threaded parts of machine tools or the like with the threaded engagement between the parts equal to 1 to 1½ times the diameter of the threads. For example, where the thread diameter is one inch, the threaded engagement between the parts should be between 1 and 1½ inches. Referring to the above table, for example, it is there shown that a size 50 spindle nose and arbor employs one inch diameter threads on the drawbolt and arbor. It is, therefore desirable that the threaded engagement of the drawbolt and arbor should be between one and one and one-half inches. Referring to Fig. 2, the drawbolt 25 there shown illustrating the present invention moves longitudinally between the limits determined by the thrust bearings 31 and 32 which are engaged by the thrust shoulder 34. In a machine tool designed for use with a size-50 spindle nose and arbor, the movement permissible between the thrust bearings is, for example, ¾ inch. The drawbolt shown in Fig. 2 would thus be capable of outward movement for a distance of ¾ inch. Referring to the table, the height of the driving key, that is the keys 23 shown in Figs. 1 and 2, is ½ inch. A clearance of ⅛ inch is provided, according to the table, between the flange and the gage diameter which is the end of the tapered portion of the shank. With the foregoing dimensions, therefore, the possible key engagement is about ⅜ inch. When retracted, drawbolt 25 extends into the spindle socket such that an initial key engagement of 3/32 inch is provided. Therefore, the total thread engagement between the spindle drawbolt and the tool shank or arbor is equal to the sum of ⅜ inch and ¾ inch, minus 3/32 inch or about 1 1/32 inch. This falls within the standard of good engineering practice, as set forth above, of between 1 and 1½ inches.

By biasing the drawbolt 25 inwardly under the action of the spring 36, the possibility that the drawbolt threads 28 might engage the arbor threads 29 and rotate the tool while the arbor is still clear of the keys 23 is precluded. Undesired rotation of the tool is thus prevented and this hazard is eliminated without necessitating a departure from the use of standard spindle nose and arbor dimensions. A horizontal boring, drilling and milling machine equipped with the above described drawbolt mechanism can be used with existing standard arbors and tool shanks. Furthermore, the novel drawbolt can be easily installed in any standard spindle equipped for power drawbolts.

The threads 29 of the shank 19 are prevented from being jammed on the threads 28 of the inwardly biased drawbolt by the use of hardening techniques to harden the drawbolt and arbor threads. Accordingly, it does not matter that the tool operator forcibly inserts the tool into the spindle nose because the hardened threads prevent any damage or jamming.

In order to reduce the weight on the spindle and to simplify the mounting of the drawbolt transmission, the drawbolt power transmission, indicated generally as 40 (Fig. 6), is mounted on the rear of the spindle ram guide 41. The drawbolt 25, mounted in the spindle 10, is desirably connected to its power transmission to provide for relative axial movement between the drawbolt and its transmission. One method of accomplishing this is by the use of a spline shaft and sleeve connection between the drawbolt and its transmission. One form of spline shaft and sleeve connection comprises a sleeve 45 threaded to the front portion of the drawbolt and secured thereto by a pin 46 (Fig. 3) to prevent disengagement. A spline shaft 48 is mounted for axial movement within the sleeve 45 (Fig. 4) and is splined thereto through an internally splined collar 49 threadably secured and welded to the rear end of the sleeve 45 (Fig. 5). In the present embodiment the drawbolt thrust shoulder 34 is formed as an integral part of the splined collar 49. The free end of the spline shaft 48 is engaged with the transmission 40 to be described. Thus, as the spindle 10 is moved by the ram 12, the sleeve 45 and spline shaft 48 move relative to each other, affording a continuous but axially slidable connection between the drawbolt 25 and its power transmission 40.

The power transmission 40 for the drawbolt (Fig. 6) comprises a torque motor 50 connected through a series of speed reducing gears 51—54 to a stub shaft 56 mounted in a web in one end of the ram guide. One end of the stub shaft 56 is splined, as at 57, for receiving a toothed clutch 58 for axial movement thereon. A second clutch member 60 is rotatably mounted by suitable bearings 61 in a second partition in the ram guide and is splined to one end of the drawbolt spline shaft 48. The first clutch member has a pair of projecting clutch teeth 63, 64 adapted to engage complementary teeth 65, 66 on the opposing clutch member. Movement of the first clutch member 58 on the spline stub shaft 56 is accomplished by a solenoid actuated lever 68 which, when the solenoid R is energized, positions a shifter fork 69 pivoted to the clutch by suitable shoes 70.

An electric circuit is provided (Fig. 10) for actuating the drawbolt torque motor 50 either in the direction for clamping the tool 18 in the spindle 10 or in the direction for unclamping the tool. To prevent the operation of the spindle rotating motor 72 (Fig. 10) when the drawbolt clutches are engaged, a limit switch 73 (Figs. 6 and 10) is mounted with its contact operating arm 74 adjacent the solenoid lever 68.

When the solenoid is energized to engage the clutches 58, 60, the solenoid lever 68 moves away from the limit switch arm 74 and the contacts of the switch 73 are opened. This breaks the circuit to the spindle motor which cannot then be started. Should the drawbolt clutches stick in their engaged position even when the solenoid is de-energized, the limit switch 73 will remain open to prevent spindle operation. When the drawbolt clutches are disengaged, the solenoid lever 68 moves the switch arm 74 to close the switch. The machine tool spindle 10 can then be rotated.

Referring to Fig. 10, the electric circuit there shown serves to control the energization of the spindle motor 72 and the drawbolt torque motor 50. A three-phase alternating current power supply, consisting of power lines L1, L2 and L3, is provided for energizing the motors. The control circuit is energized by means of two lines L4 and L5 connected to lines L1 and L2 by a voltage drop transformer T.

Means are provided for preventing the drawbolt from rotating the spindle under any condition. One means is shown schematically in Fig. 10 and comprises a limit switch LS1 in the drawbolt circuit which is in the closed position only when there is a geared connection between the spindle 10 and the spindle transmission. The spindle transmission includes a magnetic brake 76 which is energized to brake the transmission whenever the spindle motor is de-energized from the "run" position. When the magnetic brake is energized and the spindle is geared to the transmission, the spindle is prevented from rotating through the braking action of the magnetic brake.

With the spindle transmission in gear LS1 is closed. The tool arbor or shank is then inserted in place in the spindle nose and the power drawbolt control switch S1 is operated to the In position. Thereupon a contactor C1 is energized, closing contacts C1a, C1b, C1c and energizing the drawbolt motor 50 to rotate the drawbolt 25. Simultaneously, contactor C1 closes contact C1d and the circuit to the magnetic brake 76 is closed, in case the spindle selector is in the jog or shift position, thereby ensuring the operation of the magnetic brake.

Upon the closing of contacts C1a and C1b, the drawbolt clutch solenoid R is energized to engage the first clutch member 58 to the second clutch member 60. Rotation of the drawbolt motor 50 through gears 51 through 54 serves to rotate the drawbolt spline shaft 48, the drive collar 49, and the drawbolt sleeve 45, which in turn rotates the drawbolt 25.

When a cutting operation has been completed and it is desired to release the tool from the spindle, the spindle is geared to the spindle transmission, thereby closing LS1. The drawbolt switch S1 is then operated to the Out position, thereby energizing contactor C2. This closes contacts C2a, C2b, C2c and energizes the drawbolt motor 50 in the reverse direction to rotate the drawbolt 25 in a direction for unthreading the drawbolt from the tool arbor. The drawbolt clutch solenoid R is energized upon the closing of contacts C2a and C2b, the first and second clutch members are engaged. Simultaneously, contact C2d is closed to ensure the operation of the magnetic brake.

The spindle motor can be started only when the limit switch 73 is closed, which condition occurs when the clutch solenoid R is de-energized. In order to operate the spindle, the spindle selector switch S2 is set to the desired Run, Jog or Shift position and the spindle direction selector switch S3 is positioned so that the spindle will rotate in the righthand or the lefthand direction. If, for example, lefthand rotation is desired, the spindle direction selector switch S3 is set to the position shown in Fig. 10. Start switch S4 is closed, thereby energizing contactor C4 to close contacts C4a, C4b, C4c and to energize the spindle motor 72 for rotation in the lefthand direction. Contactor C4 closes contact C4d by-passing the start switch S4 and opens contact C4e to ensure that the magnetic brake is off when the spindle is rotating. If the spindle selector switch S2 is in the Jog or Shift position, however, contact S2a is open and, upon release of the start button, the spindle motor 72 stops.

Rotation of the spindle motor in the opposite direction is accomplished through the spindle rotation direction selector switch S3, a similiar contactor C5 and contacts C5a, C5b, C5c, C5d and C5e, serving the same functions as described above in connection with contactor C4.

To mount a tool 18 in a spindle 10 which is equipped with the above-described drawbolt 25 and which is initially in the position as shown in Fig. 2, the tapered shank 19 of the tool is inserted into the tapered socket 20 in the end of the spindle where it engages the extending portion 28 of the drawbolt 25. The keys 22, 23 on the end of the tool head and the spindle respectively are engaged with each other and the drawbolt 50 motor is actuated to rotate the drawbolt 25, thereby threading the end of the drawbolt into the threaded recess 29 in the tapered shank. Rotation of the drawbolt continues after forward movement of the drawbolt has been stopped by the engagement of the collar 34 on the rear end thereof with the forward thrust bearing 31 to pull the tool 18 into the spindle 10. When the torque motor stalls, the tool is tightly seated in the spindle. The torque motor 50 is of a type adapted to stall under a predetermined load, and is ideally suited for use with the power drawbolt where it is desirable to hold the tool in the spindle with a predetermined force.

Figure 7:
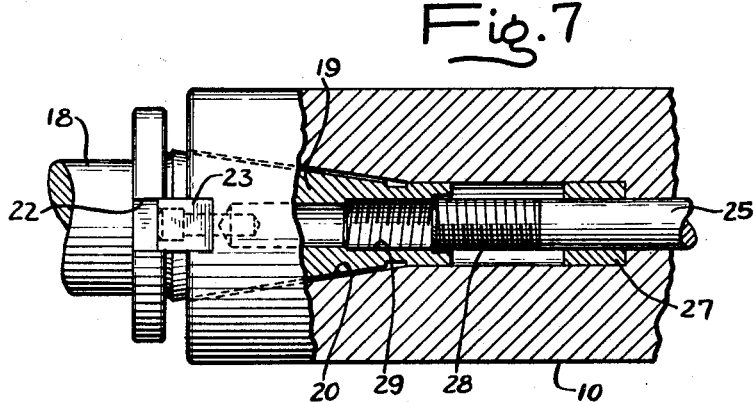
Figs. 7, 8 and 9 are fragmentary views partly in section of a machine tool spindle equipped with a drawbolt illustrative of the present invention and showing a cutting tool arbor in successive stages of being mounted in place.
Figure 8:
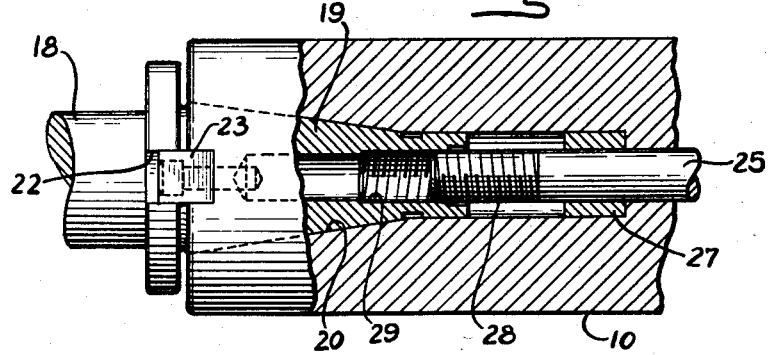
Figure 9:
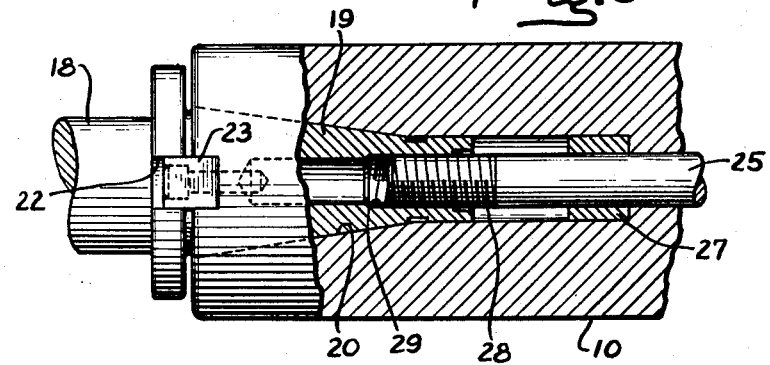

To illustrate the action of the novel drawbolt 25 when mounting a tool on a spindle 10, reference should be made to Figs. 7, 8 and 9. Fig. 7 illustrates the initial position of the drawbolt as the tool arbor is inserted in the spindle nose. The drawbolt 25 is biased rearwardly or inwardly of the spindle 10. As the arbor threads 29 engage the drawbolt threads 28, it can be seen that the spindle keys 23 are engaged in the key slots 22 on the tool 18. At this point the drawbolt motor is energized and the drawbolt begins to rotate and thread itself into the arbor 19 as shown in Fig. 8. This pulls the tapered portion of the arbor into snug engagement with the tapered nose socket 20 in the end of the spindle further engaging the keys 23 in the slots 22. When the arbor is seated in the nose socket 20, the drawbolt continues to rotate until it reaches the position shown in Fig. 9, at which point the thrust shoulder 34 is engaged with the forward thrust bearing 31 (Fig. 1). Further movement of the drawbolt is precluded and the torque motor 50 stalls. The tool 18 is thus tightly and securely seated in the spindle nose and the drawbolt motor is de-energized. The tool is then ready to perform its intended cutting operations.

Suitable cutting operations can be performed with the tool held in place by the drawbolt as the spindle is rotated and fed relative to a workpiece. When the cutting operation is completed and it is desired to remove the tool, the spindle motor is de-energized. The power drawbolt motor is then energized but in the reverse direction. Simultaneous energization of the clutch solenoid causes the clutch members to engage thereby rotating the drawbolt to break the tight engagement between the drawbolt and the tool shank and between the tool shank and the spindle to facilitate removal of the tool. If only the connection between the drawbolt and the shank is initially loosened, the drawbolt will be threaded out of the tool shank and the drawbolt will move rearwardly until the collar strikes the rear thrust bearing.

As an important feature of the present invention, means are provided for imparting a hammer-like blow to the tool shank or arbor for releasing it from the spindle nose. This is accomplished through the co-action of the rear thrust bearing 32 and the thrust shoulder 34 on the end of the drawbolt sleeve. When the tool is held tightly in the nose of the spindle, the drawbolt is in its forwardmost position and the thrust shoulder 34 abuts the forward thrust bearing 31. Upon the energization of the drawbolt torque motor 50 in the direction for removing the tool, the drawbolt is rotated in a direction for releasing the threaded engagement between the drawbolt threads 28 and the tool threads 29 (Fig. 9). The drawbolt, accordingly, moves rearwardly to a point at which the thrust shoulder 34 sharply engages the rear thrust bearing 32. A hammer-like blow is then imparted in an axial direction to the tool tending to loosen the tool shank from the spindle socket (Fig. 8). It is important to note, however, that the spindle keys 23 remain engaged with the key slots 22 on the tool. Rotation of the drawbolt continues until the tool is free from the drawbolt and can be easily removed from the spindle (Fig. 7). When the tool has been removed, the drawbolt is held, by a spring 36, in its rearward or inward position in the spindle and in readiness for the next operation. The motor 50 and solenoid R are then de-energized, allowing the drawbolt clutch members 58 and 60 to be disengaged as the spring 73a moves the first clutch member 58 rearwardly and out of engagement with the second clutch member 60.

An improved power actuated drawbolt has been described, which drawbolt affords substantial ease of engagement between a tool and a spindle with regard for the utmost safety and protection of the operator by preventing rotation of the cutting tool by the drawbolt relative to the spindle. Only a small portion of the drawbolt projects into the spindle socket for engaging the shank of the tool.

The amount of extension of the drawbolt into the spindle socket is preferably only enough to engage the first or second thread of the threaded portion of the tool shank when it is inserted into the spindle socket. This threaded engagement thus takes place only when the keys on the spindle are engaged in the key slots on the tool.

As a further advantage of the above-described drawbolt, it can be seen that the drawbolt includes a splined sleeve and connection affording axial movement of the spindle relative to the drawbolt power mechanism. The additional weight of the drawbolt transmission is not added to the tool spindle, but is supported directly in the machine tool housing. The improved drawbolt is thus seen to be easily installed and operated and is susceptible of rapid and positive operation for clamping a cutting tool into a rotatable and axially translatable machine tool spindle.

I claim as my invention:

1. In a machine tool, the combination comprising a spindle having a bore therethrough opening into a socket for receiving an inserted tool shank and key members on the end thereof adjacent the socket for engaging the inserted tool, a drawbolt axially slidable and rotatable within said spindle bore and having a tool shank engaging portion on one end thereof extending into said socket for engaging an inserted tool shank, an annular shoulder on said drawbolt adjacent the end thereof opposite from the tool shank engaging end, a pair of spaced thrust bearings supported within the spindle bore on opposite sides of said annular shoulder for engaging the same to limit axial sliding movement of said drawbolt, a second shoulder on said drawbolt intermediate the ends thereof, said spindle having a shoulder within said bore between said second drawbolt shoulder and the tool socket, a spring acting between said second drawbolt shoulder and said spindle shoulder biasing said drawbolt inwardly to the extent of the rearmost one of said thrust bearings, said drawbolt being of a length such that a predetermined portion of said tool shank engaging portion extends into said socket when said drawbolt is biased rearwardly thereby to insure that the spindle keys are engaged with the inserted tool when the drawbolt is engaged with the inserted tool shank, and means including a torque motor for rotating said drawbolt, said drawbolt being pulled outwardly to the extent of said forwardmost thrust bearing when said tool shank engaging portion is engaged with an inserted tool shank and the drawbolt is rotated whereby the tool is securely held on the spindle.

2. In a machine tool, the combination comprising a spindle having a bore extending axially therethrough opening at one end into a tool shank receiving socket and key member on the socket end thereof for engaging a tool inserted into the socket, a drawbolt journaled centrally within said spindle bore and axially slidable therein, one end of said drawbolt having a tool shank engaging portion projecting into said socket for engaging an inserted tool shank, an annular shoulder on said drawbolt adjacent its other end, a pair of spaced thrust bearings within the spindle bore for engaging said shoulder to limit axial movement of said drawbolt, means for rotating said drawbolt, and a spring surrounding said drawbolt and acting between a shoulder in said spindle bore and a collar on said drawbolt for urging said tool engaging drawbolt end portion in a direction withdrawing it from said socket into said spindle, said drawbolt being of a length such that a predetermined portion of the tool shank engaging end portion thereof extends into the tool receiving socket when said drawbolt is urged rearwardly against said rear thrust bearing thereby to insure that the spindle keys are engaged with the tool when the drawbolt is engaged with the inserted tool shank.

3. In a machine tool, the combination comprising a spindle having a bore therethrough opening at its forward end into a socket for receiving an inserted tool shank and a key member on the socket end thereof for engaging a tool inserted into the socket, a drawbolt axially slidable and rotatable within said spindle bore and having a tool shank engaging portion on one end thereof extending into said socket for engaging an inserted tool shank, an annular shoulder on said drawbolt adjacent the other end, means in said spindle bore engageable with said drawbolt shoulder for limiting axial sliding movement of said drawbolt, means for rotating said drawbolt, and means for biasing said drawbolt inwardly to the extent of said limiting means so that a predetermined portion of said tool shank engaging portion extends into said socket for engagement with the inserted tool shank when the spindle key member is engaged with the tool, said drawbolt being pulled outwardly to the extent of said limiting means when said tool shank engaging portion is engaged with an inserted tool shank and the drawbolt is rotated, the axial sliding movement of said drawbolt as determined by said limiting means being such that the total drawbolt engagement with the inserted tool shank when the spindle key member is engaged with the tool, said drawbolt being pulled outwardly to the extent of said limiting means when said tool shank engaging portion is engaged with an inserted tool shank and the drawbolt is rotated, the axial sliding movement of said drawbolt as determined by said limiting means being such that the total drawbolt engagement with the inserted tool shank holds the tool securely on the spindle.

4. In a machine tool, the combination comprising a spindle having a bore therethrough opening at its forward end into a socket for receiving an inserted tool shank and keys on the socket end of the spindle for engaging the inserted tool, a drawbolt journaled within said spindle bore for axial and rotary movement with respect thereto, one end of said drawbolt having a tool shank engaging portion projecting into the socket for engaging the inserted tool shank, means for rotating said drawbolt, means for limiting axial movement of said drawbolt within said spindle, and means for urging said drawbolt axially rearwardly to withdraw a portion of the tool engaging end from said socket, said limiting means determining the projection of said tool engaging portion into said socket so that the spindle keys must be engaged with the tool when the drawbolt end portion is engaged with the tool shank.

5. In a machine tool, the combination comprising a spindle having a bore therethrough opening into a socket for receiving an inserted tool shank and key members on the end thereof adjacent the socket for engaging the inserted tool, a drawbolt axially slidable and rotatable within said spindle bore and having a tool shank engaging portion on one end thereof extending into said socket for engaging the inserted tool shank, an annular shoulder on said drawbolt adjacent the end thereof opposite from the tool shank engaging end, a pair of spaced thrust bearings supported within the spindle bore on opposite sides of said annular shoulder for engaging the same to limit axial sliding movement of said drawbolt, a second shoulder on said drawbolt intermediate the ends thereof, said spindle having a shoulder within said bore between said second drawbolt shoulder and the tool socket, a spring acting between said second drawbolt shoulder and said spindle shoulder biasing said drawbolt inwardly to the extent of the rearmost one of said thrust bearings, said drawbolt being of a length such that a predetermined portion of said tool shank engaging portion extends into said socket when said drawbolt is biased rearwardly thereby to insure that the spindle keys are engaged with the inserted tool when the drawbolt is engaged with the inserted tool shank, and means including a torque motor for rotating said drawbolt, said torque motor rotating said drawbolt in one direction for threadably engaging said tool shank and drawing the same into the spindle socket, said motor rotating said drawbolt in the opposite direction for unthreading said tool shank engaging portion from said tool shank, said rear thrust bearing being engaged by said annular shoulder as said drawbolt is unthreaded from said tool shank for imparting a hammer-like thrust on said drawbolt and tool shank thereby to loosen the tool from the spindle.

6. A drawbolt for a machine tool spindle having a bore therethrough opening into a tapered socket adapted to receive an inserted tapered shank of a tool head and having keys adjacent the socket for engaging in key slots defined in the tool head, said drawbolt comprising, in combination, a first section slidably and rotatably mounted in said spindle bore and having a threaded tool shank engaging end portion projecting into the spindle socket and into engagement with an inserted tool shank, a second section fixed at one end to the end of said first section opposite to said tool shank engaging end, said second section having an internally splined bore extending centrally therethrough, a spline shaft extending into said bore and into engagement with said second section, means for rotating said shaft so that said threaded drawbolt portion is rotated and thereby threaded into engagement with the tool shank, a pair of spaced thrust bearings mounted in said spindle bore and surrounding said second section, an annular thrust shoulder on said second section intermediate said thrust bearings and adapted to engage the same for limiting axial movement of the drawbolt, a collar on said first section adjacent the end thereof fixed to said second section, and means in the spindle bore acting against said collar for urging the drawbolt rearwardly into engagement with the rear thrust bearing, said drawbolt being of a length such that when urged rearwardly against the rear thrust bearing the tool head must engage the spindle keys when the inserted shank is engaged with the drawbolt, the drawbolt being adapted when threadably engaged with an inserted tool shank to move forwardly to the limit of the forward thrust bearing to pull said tool shank within the spindle socket thereby to hold the tool tightly on the spindle, said drawbolt being further adapted when rotated for disengagement from an inserted tool shank to move rearwardly to the limit of said rear thrust bearing and forceably engage the same to impart a hammer-like thrust on the drawbolt thereby to loosen the tool shank from the spindle.

References Cited in the file of this patent

UNITED STATES PATENTS

| | | |
|---|---|---|
| 2,667,819 | De Vlieg | Feb. 2, 1954 |
| 2,685,823 | Kaiser | Aug. 10, 1954 |

UNITED STATES PATENT OFFICE
CERTIFICATE OF CORRECTION

Patent No. 2,924,152                             February 9, 1960

William D. Zettler

It is hereby certified that error appears in the printed specification of the above numbered patent requiring correction and that the said Letters Patent should read as corrected below.

Column 9, line 37, claim 3, beginning with "when the spindle key" strike out all to and including "tool shank" in line 44, same column.

Signed and sealed this 22nd day of November 1960

(SEAL)
Attest:

KARL H. AXLINE
Attesting Officer

ROBERT C. WATSON
Commissioner of Patents